US006663945B2

(12) United States Patent
Miyano

(10) Patent No.: US 6,663,945 B2
(45) Date of Patent: Dec. 16, 2003

(54) MULTILAYER CARD

(75) Inventor: Tsuyoshi Miyano, Sunnyvale, CA (US)

(73) Assignee: ALPS Electric Co., Ltd., Tokyo (JP)

( * ) Notice: Subject to any disclaimer, the term of this patent is extended or adjusted under 35 U.S.C. 154(b) by 110 days.

(21) Appl. No.: 09/964,928

(22) Filed: Sep. 26, 2001

(65) Prior Publication Data

US 2003/0059589 A1 Mar. 27, 2003

(51) Int. Cl.[7] .......................... B32B 3/00; B42D 15/10; B42D 15/00

(52) U.S. Cl. .................... 428/195.1; 428/203; 428/914; 428/916; 283/72; 283/107; 283/108; 283/113

(58) Field of Search .................... 283/72, 94, 106–113; 428/916, 203, 914, 195.1

(56) References Cited

U.S. PATENT DOCUMENTS 4,629,215 A * 12/1986 Maurer et al. ................ 283/94
4,856,857 A * 8/1989 Takeuchi et al. ............... 359/3
5,449,200 A * 9/1995 Andric et al. ................. 283/67
5,753,352 A * 5/1998 Vanmaele et al. .......... 428/204
6,268,058 B1 * 7/2001 Tahon et al. ................ 428/426

FOREIGN PATENT DOCUMENTS

JP 08-224982 9/1996

* cited by examiner

*Primary Examiner*—Deborah Jones
*Assistant Examiner*—G. A. Blackwell-Rudasill
(74) *Attorney, Agent, or Firm*—Beyer Weaver & Thomas

(57) ABSTRACT

A multilayer card is described. The multilayer card includes a base layer, a watermark layer, an image layer, and an opaque layer. The watermark layer is provided on the base layer and is at least partially transparent. The image layer is provided on the watermark layer. The opaque layer is provided on the image layer.

9 Claims, 3 Drawing Sheets

MULTILAYER CARD

BACKGROUND OF THE INVENTION

The present invention relates to multilayer cards, and more specifically, to multilayer cards and methods of manufacturing the multilayer cards.

Various identification cards have been used for identifying individuals. Those identification cards have some security marks or prints in order to avoid counterfeiting. Furthermore, identification cards usually have to be protected against tampering on the surfaces of the cards. For example, some cards are covered by a transparent plastic film for surface protection.

In the prior art, a printer such as a thermal transfer printer prints images on a base material of such an identification card first. Then, the process of covering the card by a film is performed after printing. Therefore, the prior art requires two separate steps for making laminated tamper-proof cards: a printing step and a laminating step. However, this two-step manufacturing technique poses some problems. Since the printing step and the laminating step are performed by totally different mechanisms, it is difficult to easily incorporating two functions into a single machine. As a result, providing a printer which outputs tamper-proof, printed cards becomes economically unrealistic especially for personal use.

In view of these and other issues, it would be desirable to have a technique allowing a thermal transfer printer to print an identification card and then apply a tamper-proof layer on the card.

SUMMARY OF THE INVENTION

According to various embodiments of the present invention, a multilayer card has a base layer, a watermark layer, an image layer, and an opaque layer. The watermark layer is provided on the base layer, and is at least partially transparent. The image layer is provided on the watermark layer. The opaque layer is provided on the image layer. The opaque layer functions as a protective layer against tampering or scratching.

In some embodiments, the opaque layer includes a metallic layer.

In some specific embodiments, the opaque layer includes a regular color layer.

A further understanding of the nature and advantages of the present invention may be realized by reference to the remaining portions of the specification and the drawings.

BRIEF DESCRIPTION OF THE DRAWING

The invention, together with further objects and advantages thereof, may best be understood by reference to the following description taken in conjunction with the accompanying drawings in which.

DETAILED DESCRIPTION OF SPECIFIC EMBODIMENTS

Various embodiments of the present invention will now be described in detail with reference to the drawings, wherein like elements are referred to with like reference labels throughout.

Various embodiments of the present invention have a base layer, a watermark layer, an image layer, and an opaque layer. The opaque layer functions as a protective layer against tampering or scratching.

Figure 1:
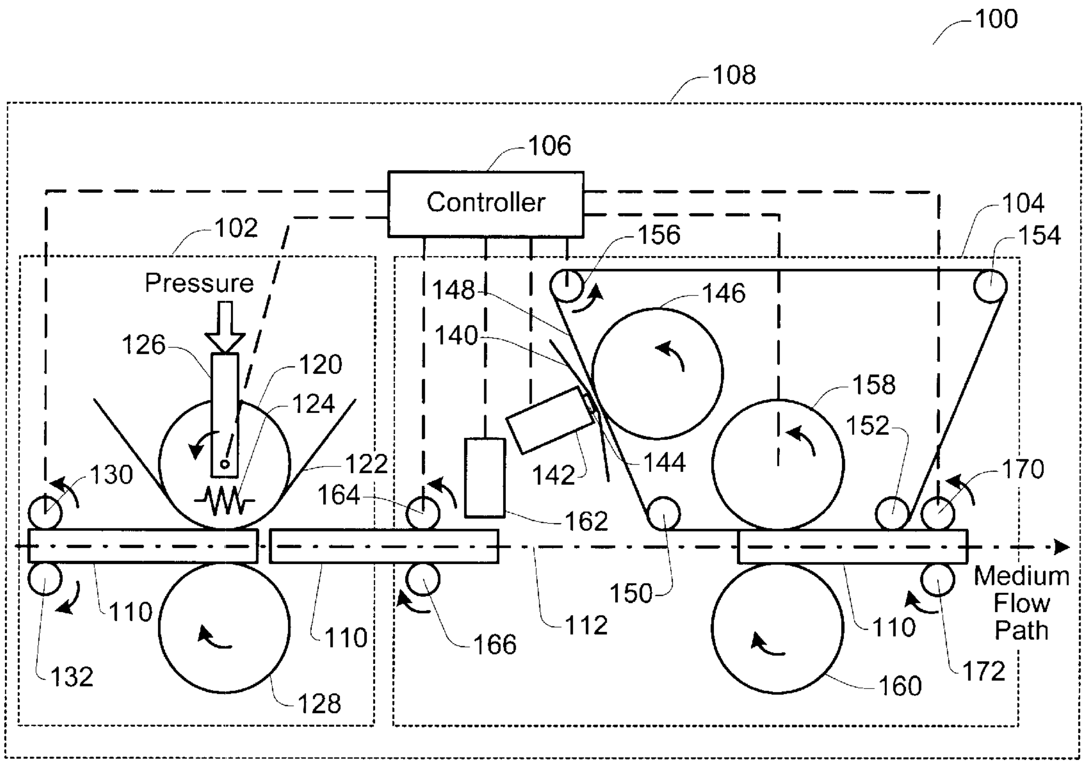
FIG. 1 is a cross-sectional view of a thermal transfer printer for manufacturing a specific embodiment of a multilayer card according to the present invention.

FIG. 1 is a cross-sectional view of a thermal transfer printer 100 for manufacturing a specific embodiment of a multilayer card according to the present invention. The thermal transfer printer 100 includes a roller printing section 102, a thermal transfer printing section 104, and a controller 106 within a housing 108. A printing medium 110 is fed along a medium flow path 112 from left to right in FIG. 1. FIG. 1 shows three locations of the printing medium 110 in the thermal transfer printer 100.

Suitable polymers for the printing medium 110 include polyvinylchloride (PVC), polycarbonate (PC), acrylonitrile-butadiene-styrene (ABS), polypropylene sulfate (PPS), and polyethylene terephthalate glycol (PETG). Circles shown in FIG. 1 represent rollers or platens, and elongated rectangulars 110 in FIG. 1 represent cards or plate-like materials used as the printing medium 110.

The roller printing section 102 includes a transfer roller 120 which is operable to heat opaque ink on an ink film 122, thereby transferring the opaque ink from the ink film 122 to the printing medium 110. In order to heat the opaque ink, the transfer roller 120 has a heater 124 therein. In order to apply pressure to the ink film 122 and the printing medium 110, the transfer roller 120 is mechanically coupled to a pressure mechanism 126 which presses the transfer roller 120 against a platen 128. The pressure mechanism 126 includes, for example, a spring. Thus, the transfer roller 120 presses the ink film 122 and the printing medium 110 against the platen 128. The ink film 122 includes at least one of a gold color layer, a silver color layer, and a bronze color layer on a base film. The base film is made from plastic materials including polyethylene terephthalate (PET).

The platen 128 included in the roller printing section 102 in this specific embodiment is a roller having a rubber layer thereon. However, the platen 128 may be any other suitable type of platen including a flat platen. Feeding rollers 130 and 132 feed the printing medium 110 onto the transfer roller 120 and the platen 128 along the medium flow path 112. The controller 106 controls rotational speeds and directions of the transfer roller 120 and the feeding roller 130 appropriately.

The thermal transfer printing section 104 is operable to heat regular color ink on a regular color ink film 140 for transfer the regular color ink from the regular color ink film 140 to the printing medium 110. The regular color ink film 140 includes at least one of a cyan color layer, a magenta color layer, a yellow color layer, a black color layer, and a white color layer on a base film. The base film is made from plastic materials including polyethylene terephthalate (PET).

The thermal transfer printing section 104 includes a printing head 142 having a plurality of resistance heating elements 144, and a platen 146. The resistance heating elements 144 apply heat to the regular color ink film 140 based on electric drive pulses representing image data. The printing head 142 presses the regular color ink film 140 and an intermediate transfer film 148 against the platen 146, thereby transferring the regular color ink to the intermediate transfer film 148 by heat and pressure. The intermediate transfer film 148 constitutes a closed loop, which rotates counterclockwise in FIG. 1 supported by feeding rollers 150, 152, 154 and 156.

The regular color ink transferred from the regular color ink film 140 to the intermediate transfer film 148 is carried counter clockwise to a point where an intermediate transfer roller 158 and a platen 160 contact the printing medium 110. In order to determine the exact position of the printing medium 110, the thermal transfer printing section 104 includes a sensor 162 which detects a predetermined point on the printing medium 110 by utilizing, for example, an optical sensing technique. Feeding rollers 164 and 166 feed the printing medium 110 onto the intermediate transfer roller 158 and the platen 160 along the medium flow path 112. The controller 106 controls rotational speeds and directions of the feeding roller 164 appropriately.

The printing medium 110 is positioned on a predetermined point on the medium flow path 112 by using the sensor 162 and the feeding roller 164 controlled by the controller 106. Then, the feeding rollers 164 and 166 feed the printing medium 110 onto the intermediate transfer roller 158 and the platen 160 along the medium flow path 112. The intermediate transfer roller 158 presses the intermediate transfer film 148 and the printing medium 110 against the platen 160, thereby transferring the regular color ink from the intermediate transfer film 148 to the printing medium 110 by pressure. Feeding rollers 170 and 172 feed the printing medium 110 out of the housing 108 of the thermal transfer printer 100 along the medium flow path 112. The controller 106 controls rotational speeds and directions of the feeding rollers 170 and 172 appropriately.

Figure 2:
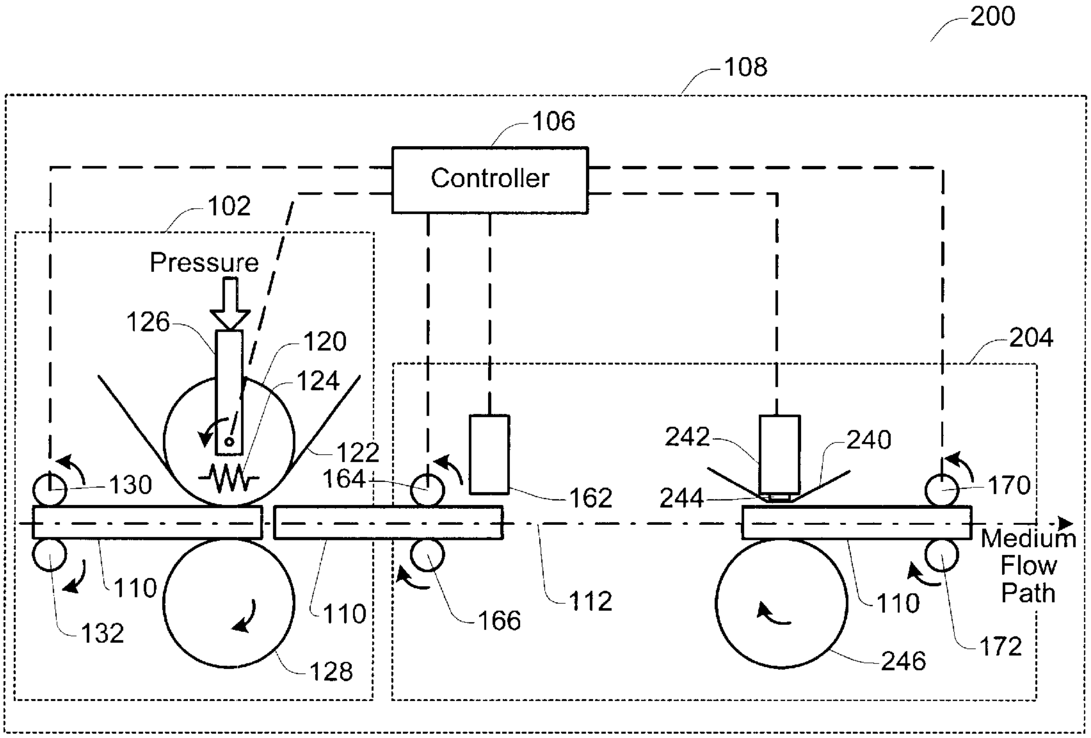
FIG. 2 is a cross-sectional view of an alternative thermal transfer printer for manufacturing the multilayer card according to the present invention.

FIG. 2 is a cross-sectional view of an alternative thermal transfer printer 200 for manufacturing the multilayer card according to the present invention. The thermal transfer printer 200 includes the roller printing section 102, a thermal transfer printing section 204, and the controller 106 within the housing 108. The differences between the embodiments shown in FIGS. 1 and 2 mainly reside in the thermal transfer printing section 204. Thus, it should be appreciated that elements in FIG. 2 which are assigned the same reference labels as shown in FIG. 1 have the same functionalities as those of FIG. 1 with the exception that the elements are designed to be coordinated with the thermal transfer printing section 204.

The thermal transfer printing section 204 is operable to heat regular color ink on a regular color ink film 240 for transfer the regular color ink from the regular color ink film 240 to the printing medium 110. The regular color ink film 240 includes at least one of a cyan color layer, a magenta color layer, a yellow color layer, a black color layer, and a white color layer on a base film, which is made from plastic materials including PET.

The thermal transfer printing section 204 includes a printing head 242 having a plurality of resistance heating elements 244, and a platen 246. The resistance heating elements 244 apply heat to the regular color ink film 240 based on electric drive pulses representing image data. The printing head 242 presses the regular color ink film 240 and the printing medium 110 against the platen 246, thereby transferring the regular color ink from the regular color ink film 240 to the printing medium 110 by heat and pressure.

In the above-described embodiments referring to FIGS. 1 and 2, the transfer roller 120 is positioned upstream relative to the thermal transfer printing sections 104 and 204 along the medium flow path 112 of the printing medium 110. Such an arrangement may be desirable where, for example, the opaque ink on the ink film 122 is printed on the printing medium 110 first, and then the regular color ink on the regular color ink films 140 and 240 is printed on the printing medium 110 since the thermal transfer printers 100 and 200 can efficiently print the opaque ink as a background layer on the whole surface of one side of the printing medium 110.

Figure 3:
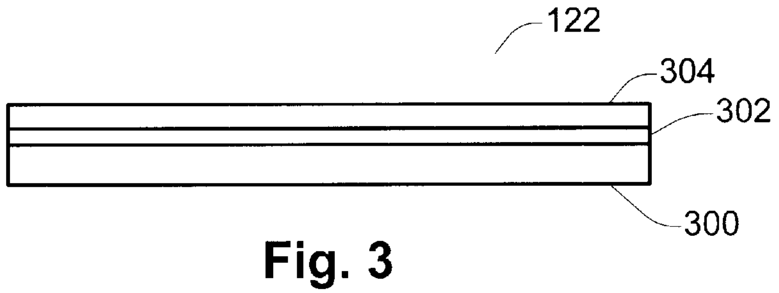
FIG. 3 is a cross-sectional view of a specific example of the ink film used for the embodiments of the multilayer card and the method of manufacturing the multilayer card according to the present invention described referring to FIGS. 1 and 2.

FIG. 3 is a cross-sectional view of a specific example of the ink film 122 used for the embodiments of the multilayer card and the method of manufacturing the multilayer card according to the present invention described referring to FIGS. 1 and 2. The ink film 122 includes a base film 300, an adhesive layer 302, and an opaque color layer 304. The base film is made from plastic materials such as PET. The adhesive layer 302 is interposed between the base film 300 and the opaque color layer 304 for affixing the opaque color layer 304 to the base film 300. The opaque color layer 304 includes at least one of "regular color layers" and "metallic layers."

In this specification, "metallic ink" includes any ink which includes metallic substance such as metallic powder, metallic film or the like. Thus, the metallic ink includes, for example, gold color ink, silver color ink, and bronze (or copper) color ink. Similarly, a "metallic layer" includes any layer which carries metallic ink thereon. Thus, the metallic layer includes metallic substance such as metallic powder, metallic film or the like. "Regular color ink" means any ink other than the metallic ink, which includes, for example, cyan ink, magenta ink, yellow ink, black ink, and white ink. A "regular color layer" includes any layer which carries regular color ink thereon.

Figure 4:
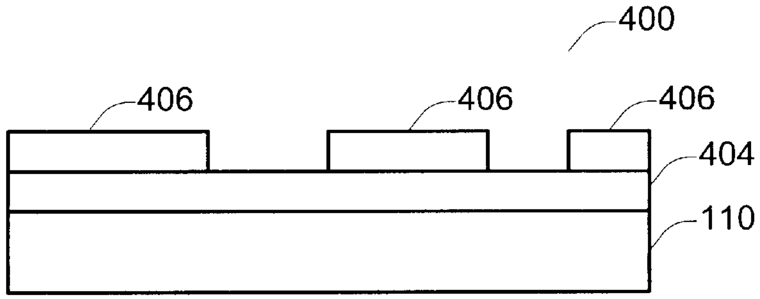
FIG. 4 is a cross-sectional view of a multilayer card of a specific embodiment according to the present invention during the printing process.

FIG. 4 is a cross-sectional view of a multilayer card 400 of a specific embodiment according to the present invention during the printing process. Before the printing process utilizing the thermal transfer printers 100 and 200, the multilayer card 400 includes only the printing medium 110. The specific embodiment of the method according to the present invention will now be described referring to FIGS. 1, 4 and 5.

First, the thermal transfer printer 100 receives the multilayer card 400 from an opening provided on the housing 108. The feeding rollers 130 and 132 feed the multilayer card 400 onto the transfer roller 120 and the platen 128 along the medium flow path 112. Next, the transfer roller 120 transfers the opaque color layer 304 from the ink film 122 to an upper surface of the printing medium 110 of the multilayer card 400. A transferred opaque color layer 404 is affixed to the printing medium 110 by heat and pressure which are applied by the transfer roller 120, the heater 124, and the platen 128. Then, an adhesive layer 406 is applied to a surface of the transferred opaque color layer 404 for improving adhesiveness between the transferred opaque color layer 404 and regular color layers printed on the transferred opaque color layer 404.

Figure 5:
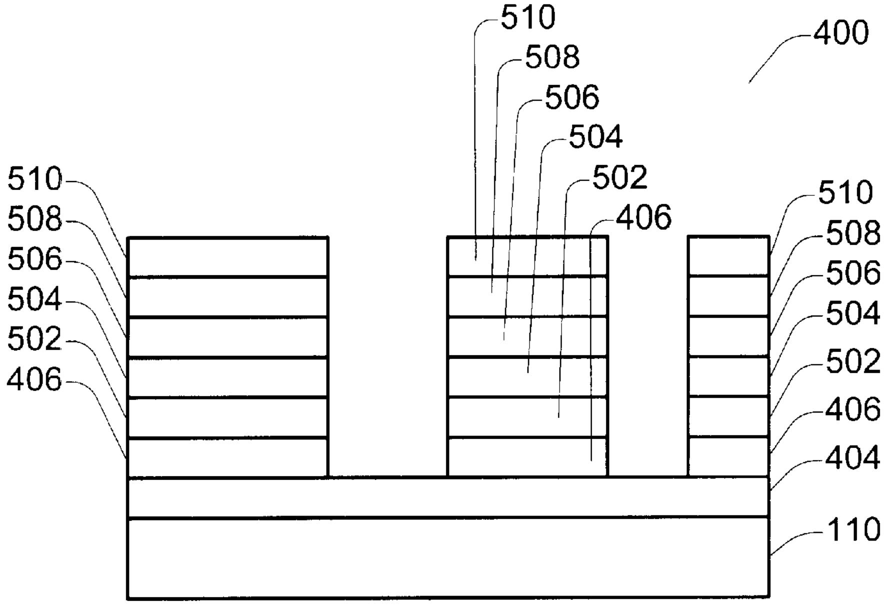
FIG. 5 is a cross-sectional view of the multilayer card of a specific embodiment according to the present invention after the printing process.

FIG. 5 is a cross-sectional view of the multilayer card 400 of the specific embodiment according to the present invention after the printing process. After printing the opaque color layer 404, the feeding rollers 164 and 166 feed the multilayer card 400 onto the intermediate transfer roller 158 and the platen 160 along the medium flow path 112. The multilayer card 400 is positioned on a predetermined point on the medium flow path 112 by using the sensor 162 and the feeding roller 164 controlled by the controller 106. Then, the feeding rollers 164 and 166 feed the multilayer card 400 onto the intermediate transfer roller 158 and the platen 160 along the medium flow path 112. The intermediate transfer roller 158 presses the intermediate transfer film 148 and the multilayer card 400 against the platen 160, thereby transferring a cyan color layer 502, a magenta color layer 504, a yellow color layer 506, a black color layer 508, and a white color layer 510 from the intermediate transfer film 148 to a surface of the adhesive layer 406. The order of printing the regular color layers may be modified appropriately. It should be appreciated that one or more layers among the cyan color layer 502, the magenta color layer 504, the yellow color layer 506, the black color layer 508, and the white color layer 510 may be omitted to be printed on the multilayer card 400.

The specific embodiment of the method according to the present invention described above referring to FIGS. 1, 4 and 5 can be implemented by utilizing the thermal transfer printer 200 illustrated in FIG. 2 in a similar manner except that the regular color printing is performed by the thermal transfer printing section 204 rather than the thermal transfer printing section 104. Thus, further detail is omitted.

In the specific embodiments described above, the regular color printing by the thermal transfer printing sections 104 and 204 can be implemented by a single thermal head. However, it should be appreciated that a plurality of thermal heads can be used for the regular color printing.

Figure 6:
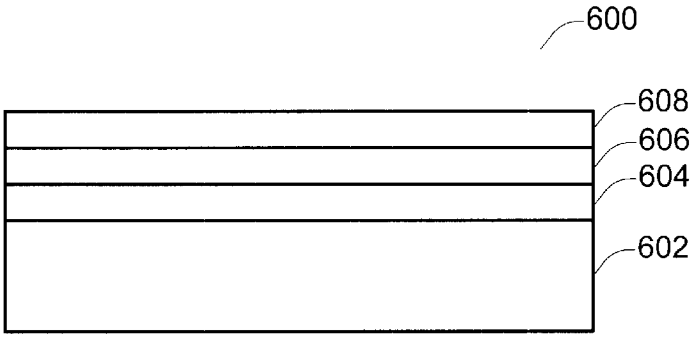
FIG. 6 is a cross-sectional view of a multilayer card of an alternative embodiment according to the present invention.

FIG. 6 is a cross-sectional view of a multilayer card 600 of a specific embodiment of the present invention. Now referring to FIGS. 1, 2 and 6, a specific embodiment of the method for manufacturing a multilayer card according to the present invention will be described. This specific embodiment of the invention utilizes one of the thermal transfer printers 100 and 200. Before the printing process utilizing the thermal transfer printers 100 and 200, the multilayer card 600 includes only a base layer 602 which corresponds to the printing medium 110 in FIGS. 1 and 2.

First, the thermal transfer printer 100 receives the multilayer card 600 from an opening provided on the housing 108. The feeding rollers 130 and 132 feed the multilayer card 600 through the transfer roller 120 and the platen 128 along the medium flow path 112. The multilayer card 600 is positioned on a predetermined point on the medium flow path 112 by using the sensor 162 and the feeding roller 164 controlled by the controller 106. Then, the feeding rollers 164 and 166 further feed the multilayer card 600 onto the intermediate transfer roller 158 and the platen 160 along the medium flow path 112. The thermal transfer printing section 104 transfers a watermark layer 604 from the intermediate transfer film 148 to the multilayer card 600. The watermark layer 604 is at least partially transparent and thus functions as a watermark for avoiding counterfeiting. The watermark layer 604 includes at least one of an ultraviolet (UV) ink layer, a holographic layer, and a special ink layer for improved security.

Second, the multilayer card 600 is again positioned on a predetermined point on the medium flow path 112 by using the sensor 162 and the feeding roller 164 controlled by the controller 106. The feeding rollers 164 and 166 feed the multilayer card 600 onto the intermediate transfer roller 158 and the platen 160 along the medium flow path 112. On top of the watermark layer 604, the thermal transfer printing section 104 transfers an image layer 606 from the intermediate transfer film 148 to the multilayer card 600. The image layer 606 includes at least one of the metallic ink and the regular color ink as described above in connection with the opaque color layer 304, by which various images including characters and graphics are represented.

Then, the feeding rollers 130, 132, 164 and 166 feed the multilayer card 600 back onto the transfer roller 120 and the platen 128 along the medium flow path 112. The transfer roller 120 transfers the opaque layer 304 from the ink film 122 to a top surface of the image layer 606 of the multilayer card 600. The opaque layer 304 is affixed to the multilayer card 600 by heat and pressure which are applied by the transfer roller 120, the heater 124, and the platen 128. A transferred opaque layer 608 includes at least one of metallic color layers and regular color layers, thereby functioning as a background layer on which the image layer 606 is printed.

Finally, the multilayer card 600 shown in FIG. 6 is moved along the medium flow path 112 from left to right in FIG. 1 through the feeding rollers 164, 166, 170 and 172 for ejection from the housing 108 of the thermal transfer printer 100.

The specific embodiment of the present invention described above referring to FIGS. 1 and 6 can be implemented by utilizing the thermal transfer printer 200 illustrated in FIG. 2 in a similar manner except that the regular color printing is performed by the thermal transfer printing section 204 rather than the thermal transfer printing section 104. Thus, further detail is omitted.

In the specific embodiments described above, the image layer printing by the thermal transfer printing sections 104 and 204 can be implemented by a single thermal head. However, it should be appreciated that a plurality of thermal heads can be used for the regular color printing.

Figure 7:
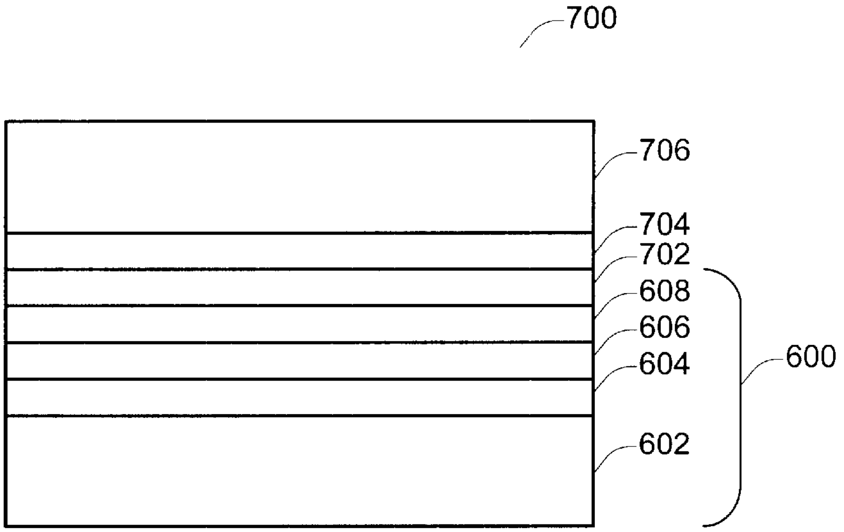
FIG. 7 is a cross-sectional view of a multilayer card of another specific embodiment according to the present invention.

FIG. 7 is a cross-sectional view of a multilayer card 700 of another specific embodiment of the present invention. Now referring to FIGS. 1, 2 and 7, another specific embodiment of the method for manufacturing a multilayer card according to the present invention will be described. This specific embodiment of the invention utilizes one of the thermal transfer printers 100 and 200. In this embodiment, further printing on the multilayer card 600 is performed utilizing one of the thermal transfer printers 100 and 200.

After the printing process described referring to FIGS. 1, 2 and 6 is finished, the multilayer card 600 is retained within the housing 108 without ejection from the housing 108.

First, the multilayer card 600, i.e., a lower part of the multilayer card 700 is positioned on a predetermined point on the medium flow path 112 by using the sensor 162 and the feeding roller 164 controlled by the controller 106. The feeding rollers 164 and 166 feed the multilayer card 700 onto the intermediate transfer roller 158 and the platen 160 along the medium flow path 112. On top of the opaque layer 608, the thermal transfer printing section 104 transfers an image layer 702 from the intermediate transfer film 148 to the multilayer card 700. The image layer 702 includes at least one of the metallic ink and the regular color ink as described above in connection with the opaque color layer 304, by which various images including characters and graphics are represented.

Second, the feeding rollers 130, 132, 164, 166, 170 and 172 feed the multilayer card 700 back to the sensor 162. The multilayer card 700 is positioned on a predetermined point on the medium flow path 112 by using the sensor 162 and the feeding roller 164 controlled by the controller 106. Then, the feeding rollers 164 and 166 further feed the multilayer card 600 onto the intermediate transfer roller 158 and the platen 160 along the medium flow path 112. The thermal transfer printing section 104 transfers a watermark layer 704 from the intermediate transfer film 148 to the multilayer card 700. The watermark layer 704 is at least partially transparent and thus functions as a watermark for avoiding counterfeiting. The watermark layer 704 includes at least one of an ultraviolet (UV) ink layer, a holographic layer, and a special ink layer for improved security.

Figure 8:
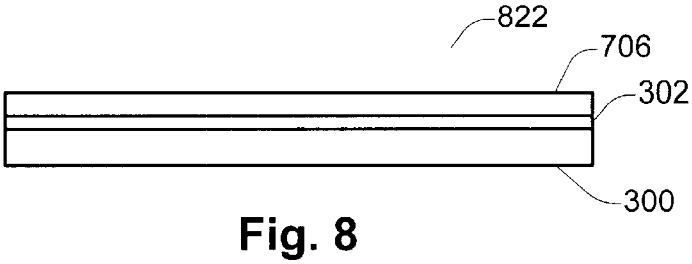
FIG. 8 is a cross-sectional view of a specific example of the base layer film used for the embodiments of the multilayer card and the method of manufacturing the multilayer card according to the present invention described referring to FIGS. 1 and 2.

Then, the feeding rollers 130, 132, 164, 166, 170 and 172 again feed the multilayer card 700 back onto the transfer roller 120 and the platen 128 along the medium flow path 112. The transfer roller 120 carries a base layer film 822 instead of the ink film 122. FIG. 8 is a cross-sectional view of a specific example of the base layer film 822 used for the embodiments of the multilayer card and the method of manufacturing the multilayer card according to the present invention described referring to FIGS. 1 and 2. The base layer film 822 includes the base film 300, the adhesive layer 302, and a base layer 706. The base film 300 is made from plastic materials such as PET. The adhesive layer 302 is interposed between the base film 300 and the base layer 706 for affixing the base layer 706 to the base film 300.

The transfer roller 120 transfers the base layer 706 to a top surface of the watermark layer 704 of the multilayer card 700. The base layer 706 is affixed to the multilayer card 700 by heat and pressure which are applied by the transfer roller 120, the heater 124, and the platen 128.

Finally, the multilayer card 700 shown in FIG. 7 is moved along the medium flow path 112 from left to right in FIG. 1 through the feeding rollers 164, 166, 170 and 172 for ejection from the housing 108 of the thermal transfer printer 100.

The specific embodiment of the present invention described above referring to FIGS. 1 and 7 can be implemented by utilizing the thermal transfer printer 200 illustrated in FIG. 2 in a similar manner except that the regular color printing is performed by the thermal transfer printing section 204 rather than the thermal transfer printing section 104. Thus, further detail is omitted.

In the specific embodiments described above referring to FIGS. 6 and 7, the base layer 602 corresponding to the printing medium 110, and the base layer 706 are made from substantially transparent materials including suitable polymers such as PVC, PC, ABS, PPS and PETG. Alternatively, the base layers 602 and 706 may be semi-transparent so that at least part of the image layers 606 and 702 can be seen from the sides of the base layers 602 and 706, respectively.

In the specific embodiments described above referring to FIGS. 6 and 7, the opaque layer 608 is made from materials including resin, cellulose, and ceramics. The opaque layer 608 is not substantially transparent, and functions as a substantially continuously and solidly filled background against which images on the image layers 606 and 702 can be seen. In some embodiments, the thickness of the opaque layer 608 ranges from about 3 $\mu$m to about 10 $\mu$m, and the thickness of the base layers 602 and 706 ranges from about 0.5 mm to about 1.0 mm.

As described above referring to FIGS. 6 and 7, the base layer 602 and the opaque layer 608 are capable of protecting the watermark layer 604 and the image layer 606, and the base layer 706 and the opaque layer 608 are capable of protecting the watermark layer 704 and the image layer 702. Thus, a specific embodiment of the multilayer card of the present invention is advantageous especially when tamper-proof and/or scratch-proof cards are necessary. Furthermore, such a specific embodiment is advantageous to enable a user to see the watermark layer 604 and the image layer 606 through the base layer 602, and to see the watermark layer 704 and the image layer 702 through the base layer 706.

The card 600 in FIG. 6 provides an image and watermark on one side of the opaque layer 608. By printing the watermark and image directly on the base layer 602 and printing the opaque layer 608 on the image layer 606, this embodiment may provide a more tamper proof card. The card 700 in FIG. 7 may provide base layers, watermarks, and images on two sides of the opaque layer 608, which may provide a card that may be even more difficult to counterfeit.

In the specific embodiments described above, the image layer printing by the thermal transfer printing sections 104 and 204 can be implemented by a single thermal head. However, it should be appreciated that a plurality of thermal heads can be used for the regular color printing. For example, five separate thermal heads can be used for five colors (e.g., cyan, magenta, yellow, and black and white) for the thermal transfer printing sections 104 and 204.

In the above-described thermal transfer printer used for the embodiment of a multilayer card according to the present invention described referring to FIGS. 1 and 2, the feeding rollers 130, 132, 164, 166, 170 and 172 are appropriately positioned along the medium flow path 112 so that the position of the printing medium 110 is controlled to go back and forth along the medium flow path 112 based on a specific printing process (e.g., watermark layer printing, image layer printing, and opaque layer printing) which is applied to the printing medium 110.

In the above examples of the thermal transfer printer used for the multilayer card according to the present invention described referring to FIGS. 1 and 2, the controller 106 can be implemented by any combination of software and/or hardware. For example, the controller 106 can be implemented by a microprocessor, a memory device which stores instruction codes and data, and an interface which drives external devices such as the feeding rollers, the transfer roller, and the intermediate transfer roller.

Although only a few embodiments of the present invention have been described in detail, it should be understood that the present invention may be embodied in many other specific forms without departing from the spirit or scope of the invention. For example, although the illustrated embodiments have been described primarily in the context of a multilayer card, it should be appreciated that various shapes of materials may be used for embodiments of the multilayer card and the method for manufacturing the multilayer card according to the present invention. Therefore, it should be apparent that the above described embodiments are to be considered as illustrative and not restrictive, and the invention is not to be limited to the details given herein, but may be modified within the scope of the appended claims.

What is claimed is:

1. A multilayer card, comprising:

a base layer;

a watermark layer provided on the base layer, the water mark layer being at least partially transparent;

an image layer provided on the watermark layer; and an opaque layer provided on the image layer, wherein the opaque layer includes a metallic layer, and wherein the watermark layer and the image layer are formed by transferring ink of an ink film using a thermal transfer printer.

2. The multilayer card of claim 1, wherein the watermark layer includes ultraviolet ink.

3. The multilayer card of claim 1, wherein the watermark layer includes a holographic layer.

4. The multilayer card of claim 1, wherein the base layer is substantially transparent; the watermark layer is printed on the base layer; the image layer is printed on the watermark layer; and the opaque layer is printed on the image layer.

5. The multilayer card of claim 1, further comprising:

another image layer provided on the opaque layer;

another watermark layer provided on the another image layer, the another watermark layer being at least partially transparent; and another base layer provided on the another watermark layer.

6. The multilayer card of claim 5, wherein at least one of the watermark layer and the another watermark layer includes ultraviolet ink.

7. The multilayer card of claim 5, wherein at least one of the watermark layer and the another watermark layer includes a holographic layer.

8. The multilayer card of claim 5, wherein the opaque layer includes a metallic layer.

9. The multilayer card of claim 5, wherein the base layer is substantially transparent; the watermark layer is printed on the base layer; the image layer is printed on the watermark layer; and the opaque layer is printed on the image layer.

* * * * *